(12) United States Patent
Maruyama (10) Patent No.: US 6,222,998 B1
(45) Date of Patent: Apr. 24, 2001

(54) CAMERA FOR CONTROLLING LIGHT EMISSION TIMING OF ELECTRONIC FLASH DEVICE

(75) Inventor: Atsushi Maruyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/388,257

(22) Filed: Sep. 1, 1999

(30) Foreign Application Priority Data

Sep. 17, 1998 (JP) .................................................. 10-262906

(51) Int. Cl.[7] .................................................... G03B 15/05
(52) U.S. Cl. ............................................ 396/187; 396/429
(58) Field of Search ..................................... 396/187, 429, 396/155; 348/64, 370, 371

(56) References Cited

U.S. PATENT DOCUMENTS 5,774,750 * 6/1998 Honda ............................... 396/371 X
5,867,741 2/1999 Maruyama et al. ................. 396/187
6,101,333 * 8/2000 Bullit et al. ....................... 348/371 X

FOREIGN PATENT DOCUMENTS

| 1-114169 | 5/1989 | (JP) . |
| 2707535 | 10/1997 | (JP) . |
| 10-20392 | 1/1998 | (JP) . |
| 10-48730 | 2/1998 | (JP) . |

* cited by examiner

Primary Examiner—W. B. Perkey
(74) Attorney, Agent, or Firm—Frishauf, Holtz, Goodman, Langer & Chick, P.C.

(57) ABSTRACT

A camera exposes an object image on a silver halide film. A shutter adjusts an object beam which reaches the silver halide film. An electronic flash device irradiates the object with flashlight. An electronic image sensing element converts the object image into an electrical signal. A timing circuit outputs the first timing signal for designating the light emission timing of the electronic flash device after the shutter is opened, and outputs the second timing signal for starting operating the electronic image sensing element in synchronism with the first timing signal.

11 Claims, 8 Drawing Sheets

CAMERA FOR CONTROLLING LIGHT EMISSION TIMING OF ELECTRONIC FLASH DEVICE

BACKGROUND OF THE INVENTION

The present invention relates to a camera and, more particularly, to an improved camera for controlling the light emission timing of an electronic flash device that can be applied to a silver halide photographing/electronic image sensing camera having both the function of an electronic image sensing device with an electronic image sensing element for converting an object image into an electrical signal, and the function of a silver halide photographing device for exposing an object image on a silver halide film.

In recent years, silver halide photographing cameras which confirm a photographed object image have been developed.

For example, Jpn. Pat. Appln. KOKAI Publication Nos. 1-114169, 10-20392, and 10-48730 disclose an electronic image sensing/silver halide photographing camera integrated with an electronic image sensing device for converting an object image into an electrical signal and a silver halide photographing device for photographing an object image on a silver halide film.

Japanese Patent No. 2,707,535 discloses a camera having different timings between photographing on a film and image sensing on a solid-state image sensing element.

In flash photography, flashlight is emitted in synchronism with the exposure timing on the film, and flashlight is emitted in synchronism with the exposure timing on the solid-state image sensing element.

However, Jpn. Pat. Appln. KOKAI Publication Nos. 1-114169, 10-20392, and 10-48730 do not disclose any camera operation in flash photography.

In Japanese Patent No. 2,707,535, the exposure timing on the film and the image sensing timing on the solid-state image sensing element are different from each other. If an object is moving, an image exposed on the film and an image exposed on the solid-state image sensing element become different from each other.

Further, in Japanese Patent No. 2,707,535, in flash photography, flashlight is emitted in synchronism with the exposure timing on the film, and flashlight is emitted in synchronism with the exposure timing on the solid-state image sensing element.

That is, flashlight must be emitted twice in one photographing cycle, wasting flash energy.

BRIEF SUMMARY OF THE INVENTION

It is an object of the present invention to provide a silver halide photographing/electronic image sensing camera capable of simultaneously taking pictures with a silver halide photographing device and electronic image sensing device without wasting flash energy.

To achieve the above object, according to one aspect of the present invention, there is provided a camera for exposing an object image on a silver halide film, comprising:

a shutter for adjusting an object beam which reaches the silver halide film;

an electronic flash device for irradiating an object with flashlight;

an electronic image sensing element for converting the object image into an electrical signal; and a timing circuit for outputting a first timing signal for designating a light emission timing of the electronic flash device after the shutter is opened, and outputting a second timing signal for starting operating the electronic image sensing element in synchronism with the first timing signal.

According to another aspect of the present invention, there is provided a camera for exposing an object image on a silver halide film, comprising:

a release operation member;

a shutter device for performing exposure operation on the silver halide film in response to operation of the release operation member;

an electronic flash device for irradiating an object with flashlight when the shutter device is opened; and an electronic image sensing device for starting operating after start of light emission from the electronic flash device, and sensing an image corresponding to the object image exposed on the silver halide film.

According to still another aspect of the present invention, there is provided a camera for exposing an object image on a silver halide film, comprising:

a release operation member;

a shutter device for performing exposure operation on the silver halide film in response to operation of the release operation member;

an electronic flash device for irradiating an object with flashlight when the shutter device is opened full; and an electronic image sensing device for starting image sensing operating prior to start of light emission from the electronic flash device, and stopping the image sensing operation during light emission from the electronic flash device.

According to still another aspect of the present invention, there is provided a camera using a silver halide film, comprising:

silver halide photographing means for performing exposure operation on the silver halide film;

electronic flash means for irradiating an object with flashlight during exposure operation by the silver halide photographing means;

electronic image sensing means for converting an object image into electronic image data; and control means for controlling a light emission timing of the electronic flash means, and image sensing start and stop timings of the electronic image sensing means so as to make an object image exposed on the silver halide film and an object image sensed by the electronic image sensing means coincide with each other.

Additional objects and advantages of the invention will be set forth in the description which follows, and in part will be obvious from the description, or may be learned by practice of the invention. The objects and advantages of the invention may be realized and obtained by means of the instrumetalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

An embodiment of the present invention will be described below with reference to the several views of the accompanying drawing.

Figure 1:
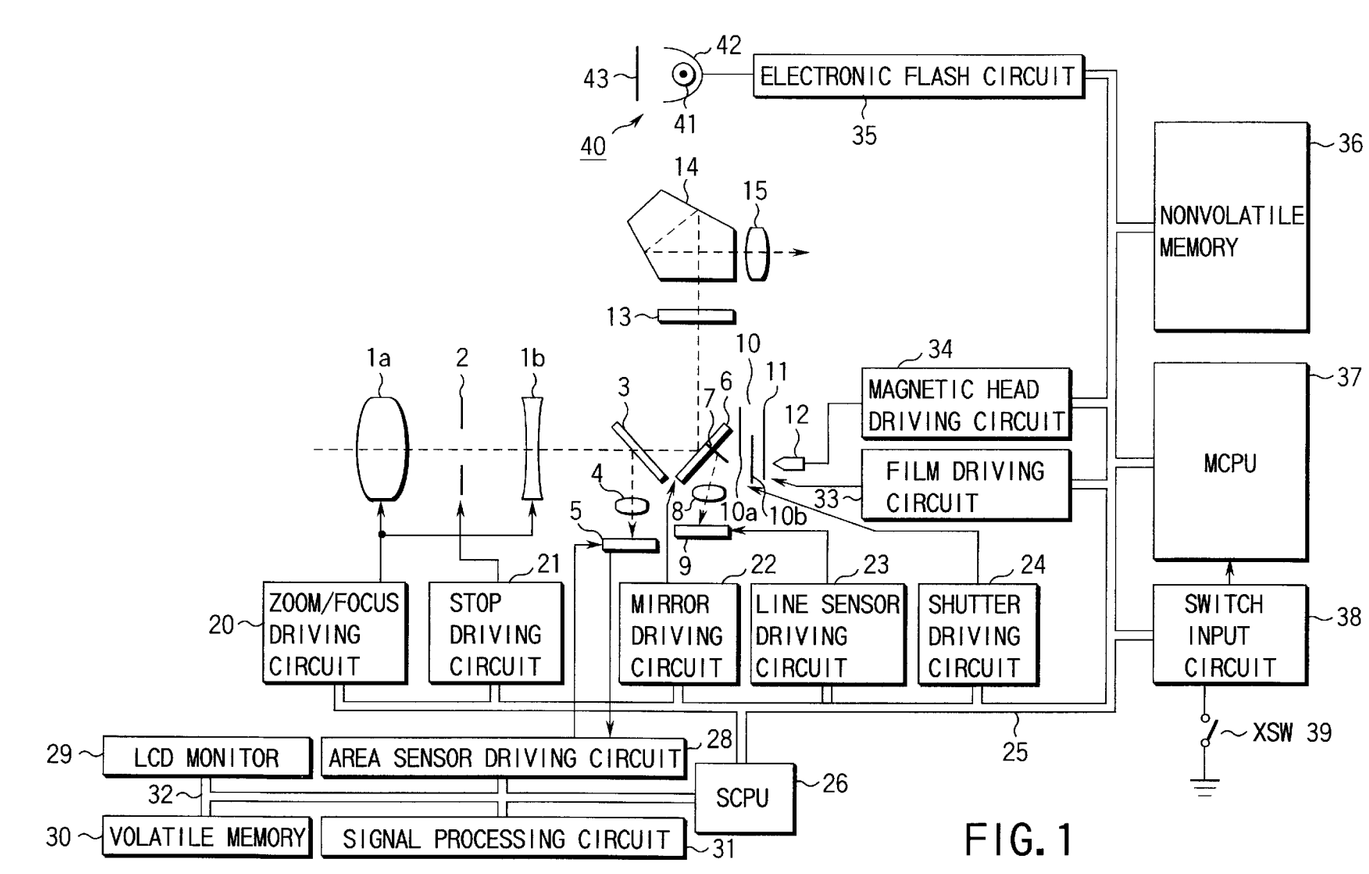
FIG. 1 is a block diagram showing the arrangement of a single-lens reflex camera to which a silver halide photographing/electronic image sensing camera of the present invention is applied.

FIG. 1 is a block diagram showing the arrangement of a single-lens reflex camera to which a silver halide photographing/electronic image sensing camera of the present invention is applied.

In FIG. 1, a photographing lens for forming an object image is constituted by a positive lens 1a and negative lens 1b interposing a stop mechanism 2 with the positive lens 1a.

That is, the stop mechanism 2 is interposed in the photographing lens.

A half-mirror 3 is disposed behind the negative lens 1b.

Part of object light reflected by the half-mirror 3 forms an image via an imaging lens system 4 on an area sensor 5 made up of a known CCD (Charge Coupled Device) image sensing element as an electronic image sensing element.

The half-mirror 3 may be replaced with a prism or beam splitter.

A movable mirror 6 having a half-mirror at almost the center is disposed behind the half-mirror 3.

A sub-mirror 7 is attached to the back surface of the movable mirror 6 at its center so as to reflect the object light downward.

A separator optical system 8 which is made up of two optical systems (not shown) and separates an image into two parts is disposed substantially vertically along the reflection optical axis of the sub-mirror 7.

A line sensor 9 is disposed at the imaging position of an object image formed by the separator optical system 8.

The sub-mirror 7, separator optical system 8, line sensor 9, and the like constitute a focus detection device by a known phase difference method.

A shutter 10 is disposed behind the movable mirror 6 when viewed from the photographing lens.

A silver halide film 11 is set behind the shutter.

When the movable mirror 6 moves up to open the shutter 10, an object image is formed on the silver halide film 11 and exposed.

After one frame is photographed, the silver halide film 11 is wound up by a film driving circuit 33.

The shutter 10 is a known focal plane shutter generally mounted in a camera having a single-lens reflex arrangement.

In the shutter 10, an internal spring (not shown) is charged prior to exposure, and a front curtain 10a and rear curtain 10b are moved by the biasing force of the spring.

A magnetic recording layer is formed on the silver halide film 11.

A magnetic head 12 is in contact with the magnetic recording layer.

The magnetic head 12 magnetically records various information on the magnetic recording layer of the silver halide film 11, and is driven by an output from a magnetic head driving circuit 34.

Magnetic recording by the magnetic head 12 is executed during wind-up operation of the silver halide film 11.

Object light reflected upward by the movable mirror 6 reaches a viewfinder eyepiece optical system 15 via a focusing screen 13 and pentaprism 14.

The lenses 1a and 1b of the photographing lens are connected to a zoom/focus driving circuit 20 for controlling driving sources for focus control and zooming.

The stop mechanism 2 is connected to a stop driving circuit 21.

The zoom/focus driving circuit 20 includes an encoder (not shown) for generating a signal in accordance with movement of the lenses.

Focus control is done based on a driving amount calculated by an MCPU 37 (to be described later) and an encoder output.

The movable mirror 6 is driven by a mirror driving circuit 22.

The line sensor 9 is driven by a line sensor driving circuit 23.

The shutter 10 is driven by a shutter driving circuit 24.

Note that a shutter means is made up of the shutter 10 and shutter driving circuit 24.

The zoom/focus driving circuit 20, stop driving circuit 21, mirror driving circuit 22, line sensor driving circuit 23, and shutter driving circuit 24 are connected to each other by a data bus 25, and also connected to an electronic flash circuit 35, nonvolatile memory 36, MCPU 37, switch input circuit 38, and SCPU 26 (which latter will be described below) in addition to the film driving circuit 33 and magnetic head driving circuit 34.

The area sensor 5 is controlled by an area sensor driving circuit 28.

An object image formed on the area sensor 5 is converted into an analog video signal which is then output to a signal processing circuit 31 via a data bus 32.

The signal processing circuit 31 executes processing of converting the analog signal into a digital signal, and predetermined signal processing including a known automatic white balance function.

The signal processing circuit 31 is connected to LCD monitor 29 serving as a monitor means, volatile memory 30, SCPU 26, and the like together with the area sensor driving circuit 28 via the data bus 32.

The analog signal from the area sensor 5 is used to measure the object luminance.

The analog signal is digitized by the signal processing circuit 31, and transmitted to the MCPU 37 via the data bus 25.

The SCPU 26 integrally controls circuits concerning an electronic image that are connected to the data bus 32.

The SCPU 26 transfers the processed signal to the volatile memory 30 and nonvolatile memory 36.

The electronic image stored in the volatile memory 30 is transferred to the LCD monitor 29 where the image is displayed.

The nonvolatile memory 36 stores various adjustment data, camera operation state, and the like.

The MCPU 37 calculates the f-number of the stop 2 and a shutter speed for obtaining proper exposure on the basis of an object luminance value output from the signal processing circuit 31, and a film speed detected by a film speed detection circuit (not shown).

The shutter driving circuit 24 drives the shutter 10 at the calculated shutter speed.

The MCPU 37 calculates the interval between two images based on a signal input via the line sensor driving circuit 23, and calculates the driving amount of the photographing lens for driving the lens to an in-focus position.

The switch input circuit 38 is made up of a plurality of switches such as an operation switch (not shown) and a detection switch for operation of the mechanism system.

An XSW 39 is a switch for detecting the operation state of the front curtain 10a of the shutter 10, and is turned on upon completion of traveling of the front curtain.

Note that the optical viewfinder is adopted in addition to the LCD monitor 29 as an object monitor because the camera holding performance is improved to hardly cause camera shake by photographing through the optical viewfinder rather than photographing while a camera operator monitors the LCD monitor 29. The camera further comprises an electronic flash unit 40 which constitutes an object illumination electronic flash device made up of a flash tube 41, reflector 42, and flash panel 43.

The respective parts of the electronic flash unit 40 are controlled by the electronic flash circuit 35.

When the MCPU 37 determines the object luminance to be lower than a predetermined luminance, the electronic flash unit 40 emits flashlight as auxiliary light.

As described above, the zoom/focus driving circuit 20, stop driving circuit 21, mirror driving circuit 22, line sensor driving circuit 23, shutter driving circuit 24, SCPU 26, film driving circuit 33, magnetic head driving circuit 34, electronic flash circuit 35, nonvolatile memory 36, MCPU 37, and switch input circuit 38 are connected by the data bus 25, and exchange data between them.

Operations of these driving circuits are integrally controlled by the MCPU 37.

Figure 2:
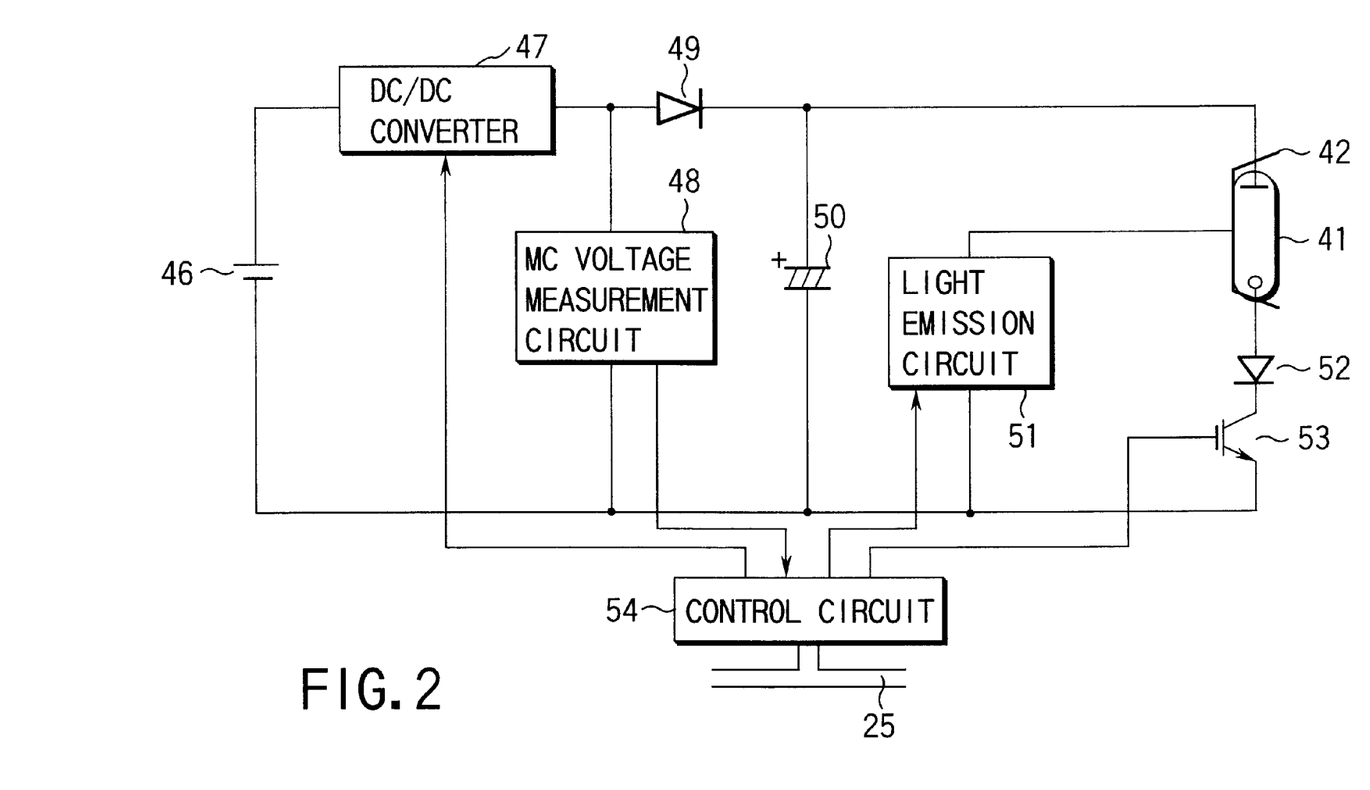
FIG. 2 is a circuit diagram showing the arrangement of an electronic flash circuit 35 in FIG. 1 in detail.
Figure 3A:
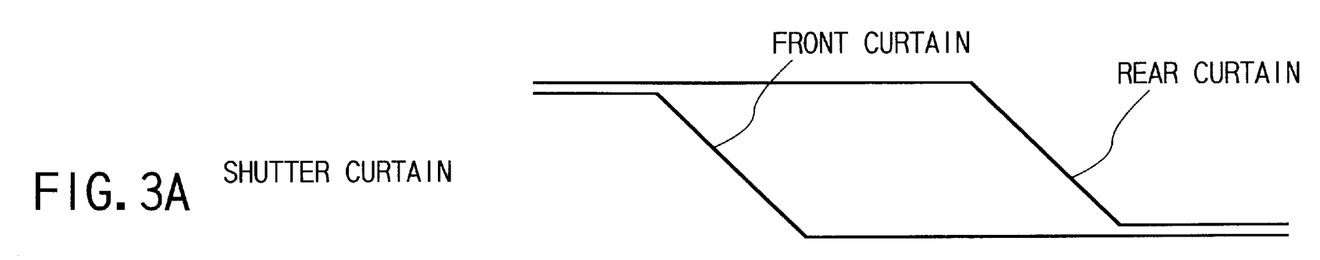
FIGS. 3A to 3G are timing charts for explaining operation when an electronic shutter operates in synchronism with the start of light emission when the film speed to visible light and the image sensing speed of an area sensor 5 are almost equal to each other (flashlight quantities contributing to proper exposure of a silver halide film 11 and area sensor 5 are almost equal to each other)
Figure 3B:
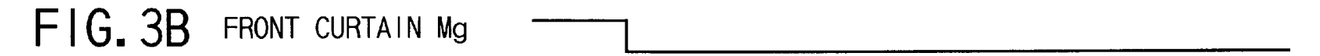
Figure 3C:
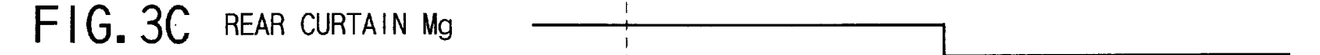
Figure 3D:
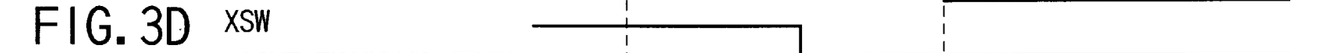
Figure 3E:
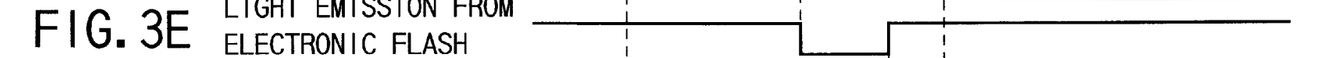
Figure 3F:
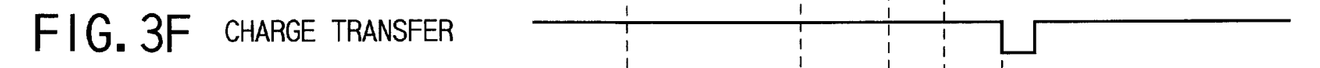
Figure 3G:
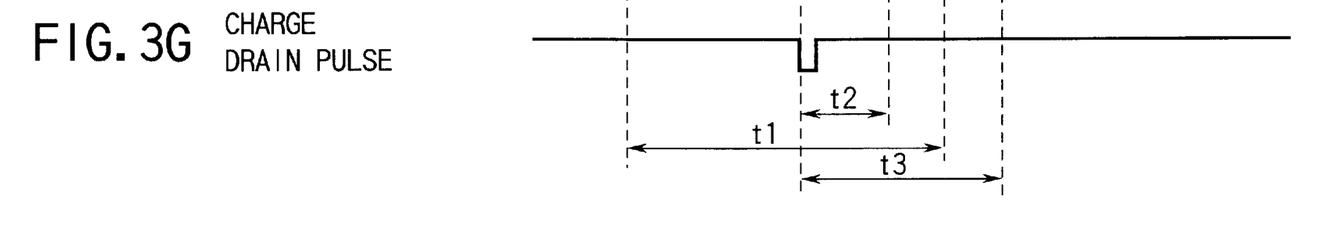
Figures 4A, 4B:
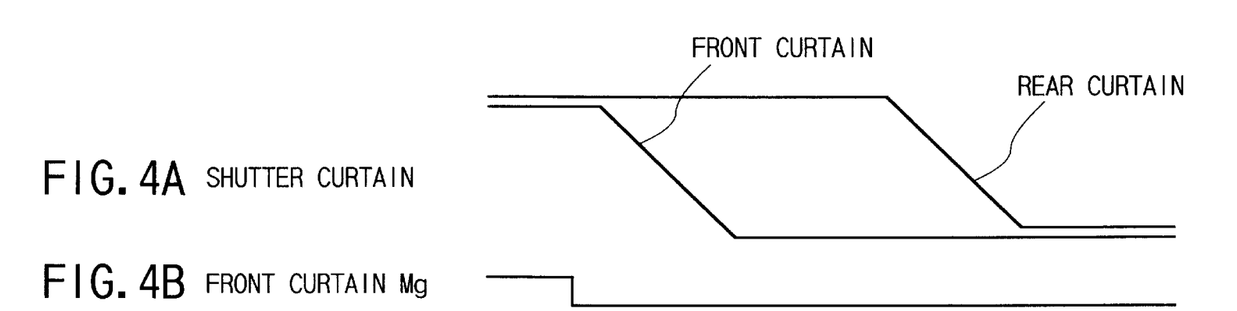
FIGS. 4A to 4G are timing charts for explaining operation when the electronic shutter operates during light emission when the image sensing speed of the area sensor 5 is higher than the film speed of the silver halide film 11 (the flashlight quantity for proper exposure on the area sensor 5 is smaller than that on the silver halide film 11)
Figure 4C:
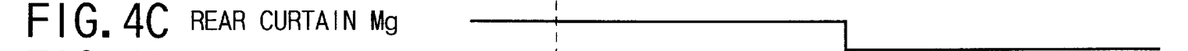
Figure 4D:
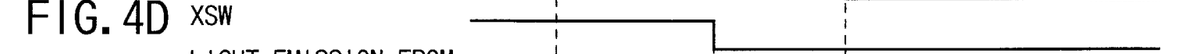
Figure 4E:
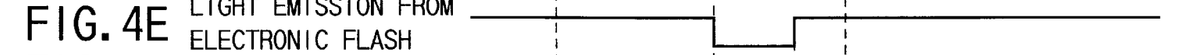
Figure 4F:
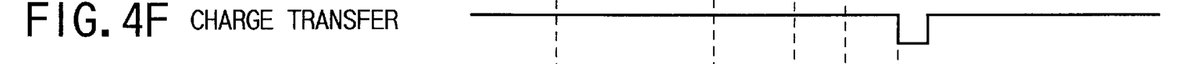
Figure 4G:
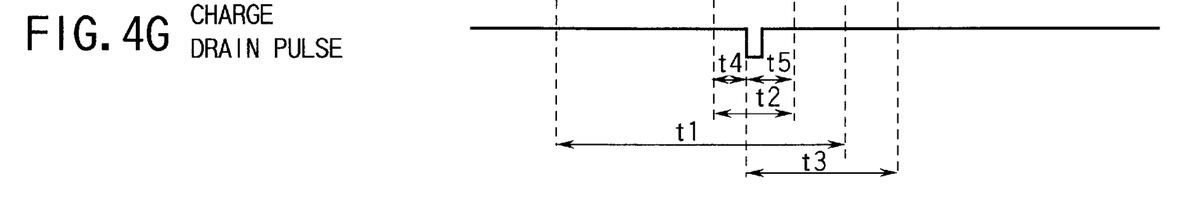
Figure 5A:
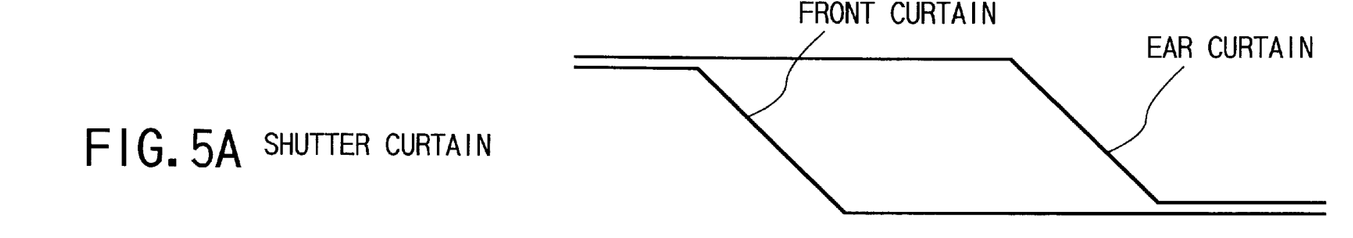
FIGS. 5A to 5F are timing charts for explaining operation when the electronic shutter operates before the start of light emission when the image sensing speed of the area sensor 5 is higher than the film speed of the silver halide film 11 (the flashlight quantity for proper exposure on the area sensor 5 is smaller than that on the silver halide film 11)
Figure 5B:
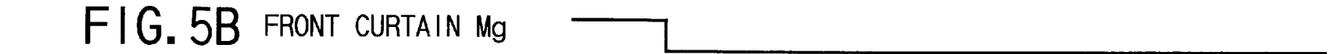
Figure 5C:
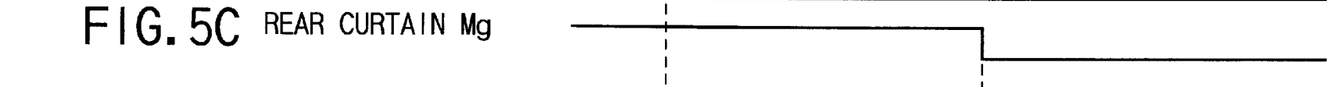
Figure 5D:
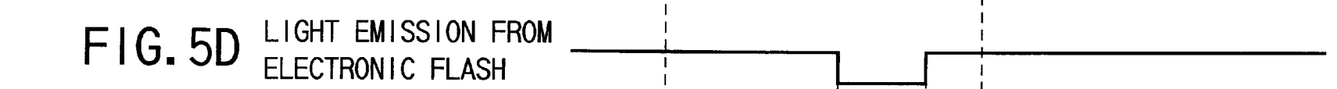
Figure 5E:
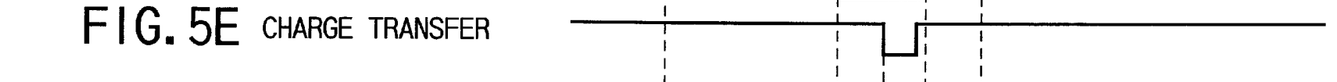
Figure 5F:
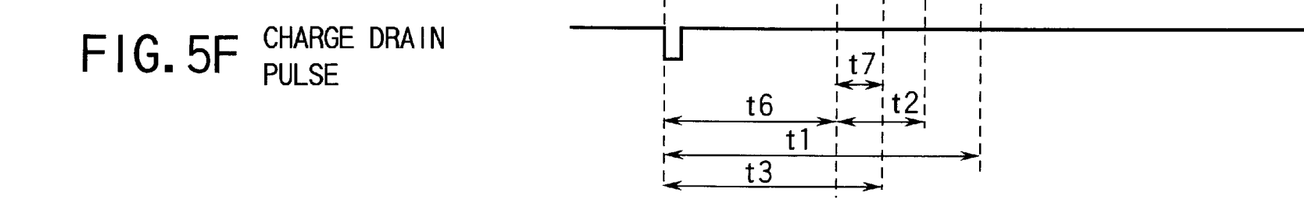

FIG. 2 is a circuit diagram showing the arrangement of the electronic flash circuit 35 in detail.

In FIG. 2, an MC voltage measurement circuit 48 is connected to two terminals of a battery 46 via a DC/DC converter 47.

The MC voltage measurement circuit 48 is connected via a diode 49 to a main capacitor 50 with the polarities shown in FIG. 2.

The positive terminal of the main capacitor 50 is connected to the anode of the flash tube 41 in which Xenon is sealed.

The cathode of the flash tube 41 is connected to the anode of a diode 52.

The cathode of the diode 52 is connected to the collector of a transistor 53.

The emitter of the transistor 53 is connected to the negative terminal of the battery 46.

The base of the transistor 53 is connected to a control circuit 54.

The control circuit 54 is also connected to the DC/DC converter 47, MC voltage measurement circuit 48, and light emission circuit 51.

The light emission circuit 51 is connected to the reflector 42 electrically connected around the flash tube 41.

In this arrangement, power supplied from the battery 46 is boosted to a predetermined voltage by the DC/DC converter 47.

The boosted output is charged in the main capacitor 50 via the diode 49.

The MC voltage measurement circuit 48 monitors the boosted voltage, and if the output from the DC/DC converter 47 reaches a predetermined voltage by the charge operation, generates a monitor signal for stopping operation of the DC/DC converter 47.

Xenon gas sealed in the flash tube 41 is excited by a high voltage output from the light emission circuit 51 to emit flashlight.

At this time, the transistor 53 is ON by an output from the control circuit 54, and charges accumulated in the main capacitor 50 flow as a light emission current from the anode of the flash tube 41 to the emitter of the transistor 53.

The flashlight quantity of the flash tube 41 is controlled to an arbitrary quantity by controlling the ON time of the transistor 53.

This electronic flash control is based on a command input from the MCPU 37 to the control circuit 54 via the data bus 25.

Note that the transistor 53 may be a known IGBT or high-breakdown-voltage MOS transistor.

FIGS. 3A to 3G to FIGS. 5A to 5F are timing charts for explaining exposure of the silver halide film 11 and area sensor 5 in the use of the electronic flash.

The timing charts shown in FIGS. 3A to 3G show the case wherein the film speed to visible light and the image sensing speed of the area sensor 5 are equal to each other (flashlight quantities contributing to proper exposure of the silver halide film 11 and area sensor 5 are almost equal to each other).

The timing charts in FIGS. 4A to 4G and FIGS. 5A to 5F show the case wherein the image sensing speed of the area sensor 5 is higher than the film speed of the silver halide film 11 (the flashlight quantity for proper exposure on the area sensor 5 is smaller than that on the silver halide film 11).

As described above, the shutter 10 is a known focal plane shutter for controlling the film exposure time by moving the front curtain 10a and rear curtain 10b.

The spring for moving the shutter curtains incorporated in the shutter 10 has already been charged, and mechanical locking between the front curtain la and rear curtain 10b has been released.

By de-energizing a front curtain magnet (Mg) and rear curtain magnet (Mg) (neither is shown), the respective curtains can travel.

A sensor unit of a plurality of CCD image sensing elements constituting the area sensor 5 is made up of a plurality of photodiodes.

Incident light is photoelectrically converted by the photodiode, the generated charges are accumulated, and so-called vertical transfer and horizontal transfer are repeated to output the incident light as a charge image externally from the CCD image sensing element.

The CCD image sensing element has a function of draining the accumulated charges, and can function as a so-called electronic shutter because the time up to transfer of the accumulated charges to the vertical CCD after draining the charges can be set to an arbitrary time.

In addition, some CCD image sensing elements have an image sensing speed adjustment means for adjusting the image sensing speed.

When the image sensing speed of the CCD image sensing element is lower than the film speed of the silver halide film 11, the image sensing speed can be generally made equal to or higher than the film speed by the image sensing speed adjustment means.

Operation when the electronic shutter operates in synchronism with the start of light emission from the electronic flash will be explained with reference to the timing charts in FIGS. 3A to 3G.

The front curtain Mg is de-energized, and the front curtain 10a travels.

Upon the lapse of a predetermined time t1, the rear curtain Mg is de-energized, and the rear curtain travels to expose the silver halide film 11.

When traveling of the front curtain 10a is completed, and the MCPU 37 detects the ON state of the XSW 39, the MCPU 37 outputs a light emission start command to the electronic flash circuit 35, and a high voltage is applied to the reflector 42 to start emitting flashlight from the flash tube 41.

Upon the lapse of a predetermined light emission time t2, the MCPU 37 outputs a light emission stop command.

Then, the transistor 53 is turned off to stop emitting flashlight.

A drain pulse for draining charges accumulated in the photodiode constituting each pixel of the area sensor 5 is applied to the area sensor 5 in synchronism with the start of light emission from the electronic flash.

After draining the charges, the electronic shutter starts operating to start sensing an image.

Upon the lapse of a predetermined time t3, the charges accumulated in the area sensor 5 are transferred and output as an image signal to the signal processing circuit 31.

Operation when the electronic shutter starts operating during light emission from the electronic flash will be explained with reference to the timing charts in FIGS. 4A to 4G.

During the light emission time t2, the charge d rain pulse is applied to the area sensor 5.

Upon the lapse of the predetermined time t3, the charges accumulated in the area sensor 5 are transferred and output as an image signal to the signal processing circuit 31.

Note that a time t4 is a time up to the start of sensing an image after light emission, and a time t5 is a time during which flashlight contributes to image sensing.

The times t1 and t2 are the same as in the timing charts in FIGS. 3A to 3G, and a description thereof will be omitted.

Operation when the electronic shutter starts operating before the start of light emission from the electronic flash will be explained with reference to the timing charts in FIGS. 5A to 5F.

In this case, light emission from the electronic flash starts not in synchronism with ON operation of the XSW 39 but upon the lapse of a predetermined time t6 after de-energization of the front curtain Mg.

That is, the charge drain pulse is applied to the area sensor 5 in synchronism with de-energization of the front curtain Mg.

Upon the lapse of the predetermined time t3, the charges accumulated in the area sensor 5 are transferred and output as an image signal to the signal processing circuit 31.

Note that a time t7 is a time during which flashlight contributes to image sensing. The times t1, t2, and t3 are the same as in the timing charts in FIGS. 3A to 3G, and a description thereof will be omitted.

Photographing operation of the camera in this embodiment will be described with reference to the flow charts in FIGS. 6 to 9.

Figure 6:
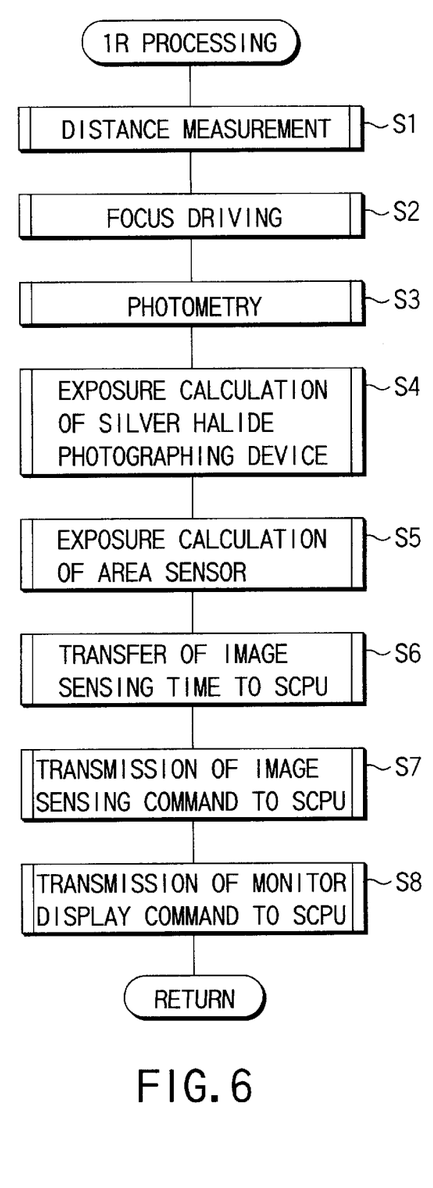
FIG. 6 is a flow chart for explaining operation of a subroutine "1R (first release) processing" in photographing operation of the camera according to an embodiment of the present invention.

When the first release switch (not shown) is turned on (depressed), a main routine (not shown) calls a subroutine "1R (first release) processing" in FIG. 6.

The release switch of the camera is made up of two press buttons, which will be sequentially called the first and second releases.

In step S1, distance measurement is done.

This distance measurement is done by calculating a driving amount to the in-focus position of the photographing lens from the interval between two images on the basis of an output signal from the line sensor 9.

At this time, an absolute distance to an object is also calculated based on the number of encoder pulse signals from the reference position (e.g., infinity position) of the photographing lens.

In step S2, the photographing lens is driven by the driving amount to the in-focus position calculated in step S1.

In step S3, the object luminance is measured based on an output from the area sensor 5.

This measurement result may be used as data for known white balance adjustment, as needed.

Photometry may be done by measuring the object luminance with a separately arranged photometer (not shown).

In step S4, the f-number and a shutter speed (corresponding to the time t1 shown in FIGS. 3A to 3G to FIGS. 5A to 5F) for obtaining correct exposure in the silver halide photographing device are calculated based on the photometric value measured in step S3, the film speed detected by a film speed detection circuit (not shown), and a program (not shown).

If flash photography is determined to be performed, a light emission time (corresponding to the time t2 shown in FIGS. 3A to 3G to FIGS. 5A to 5F) for optimizing the flashlight quantity is calculated based on the absolute value calculated in step SI, film speed, and f-number.

In step S5, an image sensing time (corresponding to the time t3 shown in FIGS. 3A to 3G to FIGS. 5A to 5F) for obtaining correct exposure in the electronic image sensing device is calculated from the photometric value measured in step S3, the f-number calculated in step S4, and the image sensing speed of the area sensor 5.

In step S6, the image sensing time calculated in step S5 is transferred to the SCPU 26 via the data bus 25.

In step S7, an image sensing command is transmitted to the SCPU 26 so as to start sensing an image.

In step S8, a monitor display command is transmitted to the SCPU 26 so as to display a sensed image on the LCD monitor 29.

Then, the subroutine returns to the main routine (not shown).

Figure 7:
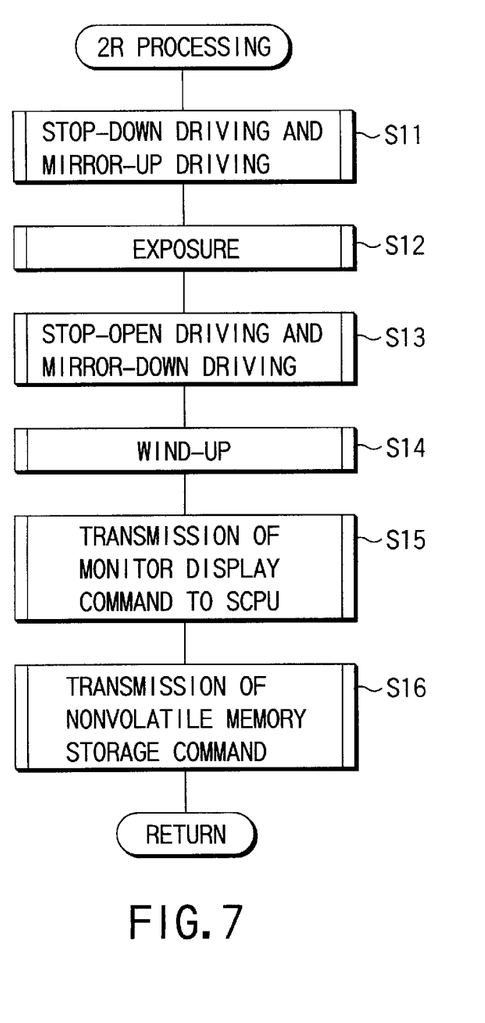
FIG. 7 is a flow chart for explaining operation of a subroutine "2R (second release) processing" in photographing operation of the camera according to the embodiment of the present invention.

If the second release switch is turned on subsequently to the first release switch (not shown), the main routine (not shown) calls a subroutine "2R (second release) processing" in FIG. 7.

In step S11, mirror-up driving is performed, and stop driving is performed to set the f-number calculated in step S4 in the flow chart of FIG. 6.

In step S12, exposure on the silver halide film 11 and image sensing by the area sensor 5 are performed substantially simultaneously.

Figure 8:
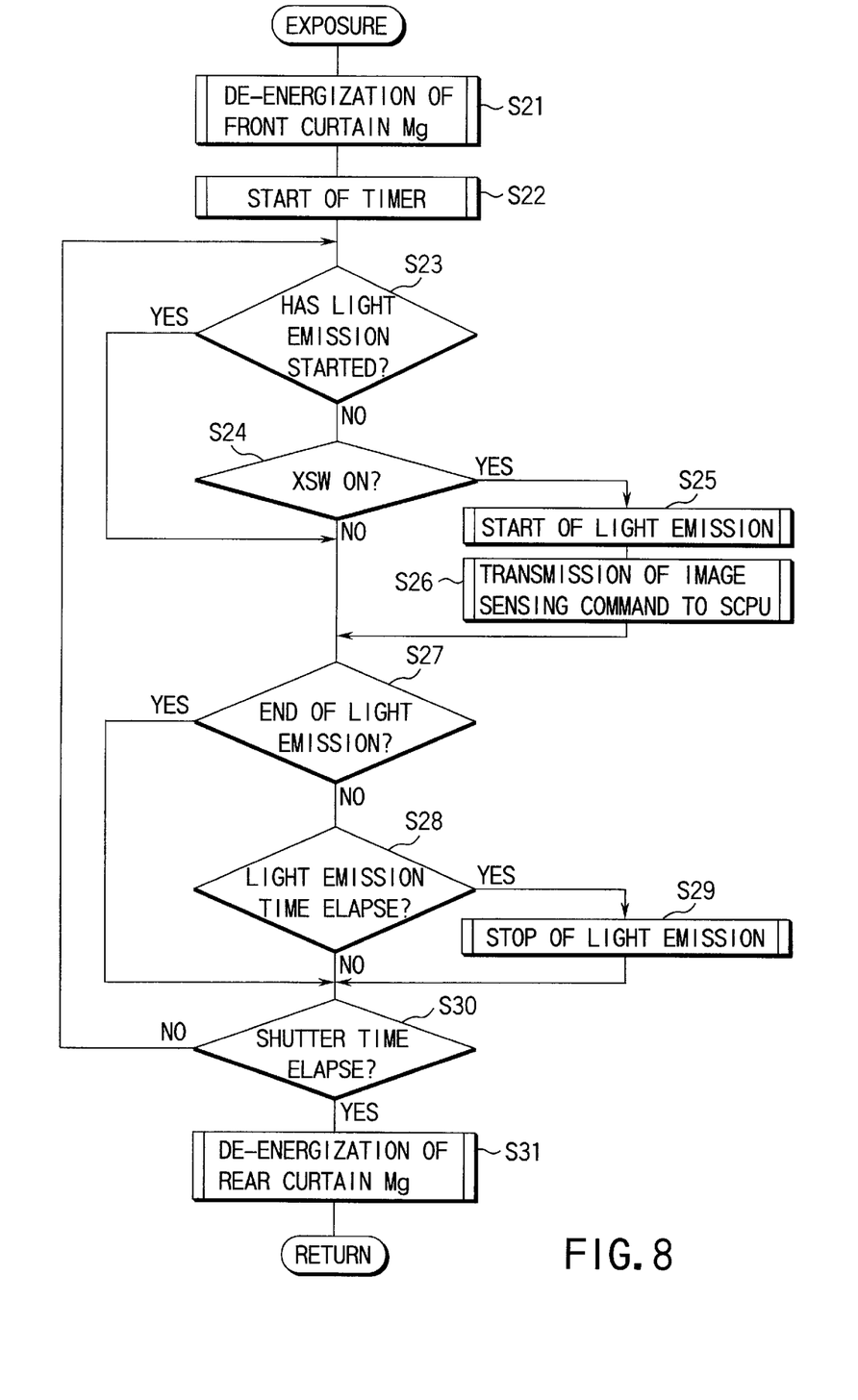
FIG. 8 is a flow chart for explaining operation of a subroutine "exposure" in photographing operation of the camera according to the embodiment of the present invention.

This will be described in detail below with reference to the flow chart in FIG. 8.

In step S13, the stop is driven to an initial position (generally to a full-aperture f-number), and at the same time the retracted movable mirror 6 returns to the original position, i.e., into the optical path.

In step S14, the film driving circuit 33 winds up the silver halide film 11 by one frame.

At this time, the magnetic head 12 magnetically records date information and the like on the magnetic recording track (not shown) on the film.

In step S15, a monitor display command is transmitted to the SCPU 26 so as to display a sensed image on the LCD monitor 29.

In step S16, a nonvolatile memory storage command is transmitted to the SCPU 26 so as to transfer data stored in the volatile memory 30 to the nonvolatile memory 36 via the data bus 25 and store the data in the nonvolatile memory 36.

After that, the subroutine returns to the main routine (not shown).

Operation of a subroutine "exposure" will be explained with reference to the flow chart in FIG. 8 in contrast with the timing charts in FIGS. 3A to 3G.

In step S21, the front curtain Mg is de-energized, and the front curtain starts traveling.

In step S22, a timer counter (not shown) incorporated in the MCPU 37 starts measuring the exposure time t1 to the silver halide film 11 and the light emission time t2 of the electronic flash.

In step S23, whether light emission from the electronic flash has already started is checked.

If YES in step S23, the flow shifts to step S27; if NO, to step S25.

In step S25, a light emission start command is output to the electronic flash circuit 35, and a high voltage is applied to the reflector 42 to start emitting flashlight from the flash tube 41.

In step S26, an image sensing command is transmitted to the SCPU 26 so as to start sensing an image.

In step S27, whether light emission has already stopped is checked.

If YES in step S27, the flow shifts to step S30; if NO, to step S28.

In step S28, whether the time t2 has elapsed after the start of light emission from the electronic flash is checked by referring to the timer counter value.

If YES in step S28, the flow shifts to step S29; if NO, to step S30.

In step S29, a light emission stop command is output to the electronic flash circuit 35, and the transistor 53 is turned off to stop emitting flashlight from the flash tube 41.

In step S30, whether the time t1 has elapsed after de-energization of the front curtain Mg is checked by referring to the timer counter value.

If YES in step S30, the flow shifts to step S31 to de-energize the rear curtain Mg, and the rear curtain travels.

Thereafter, this subroutine returns to the 2R processing subroutine.

If NO in step S30, the flow returns to step S23 to repeat the subsequent processing.

When the film speed is higher than the image sensing speed, as in the timing charts shown in FIGS. 4A to 4G, "transmission of image sensing command" in step S26 may be executed upon the lapse of the predetermined idle time t4 after executing "start of light emission" in step S25.

In the timing charts shown in FIGS. 5A to 5F, "transmission of image sensing command" in step S26 may be executed after executing "de-energization of front curtain Mg" in step S21, and "XSW on?" in step S24 may be replaced with "time t5 elapsed?".

Figure 9:
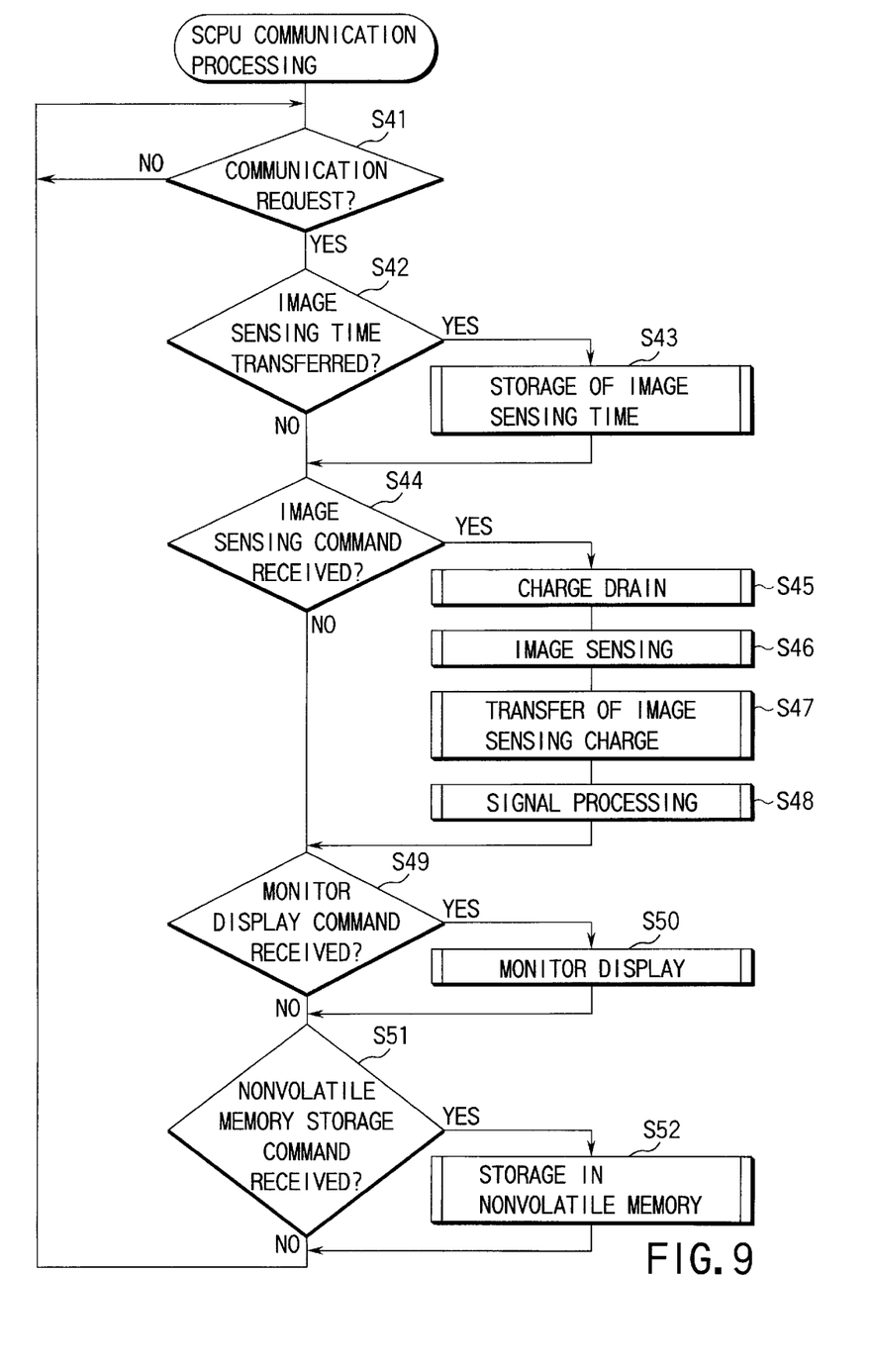
FIG. 9 is a flow chart for explaining image sensing processing by a SCPU 26 in FIG. 1.

Image sensing processing by the SCPU 26 will be explained with reference to the flow chart in FIG. 9.

In step S41, whether the MCPU 37 generates a communication request is determined.

If NO in step S41, the determination in step S41 is repetitively executed; if YES, the flow shifts to step S42.

In step S42, whether the contents of the communication request are to transfer the image sensing time is checked.

If YES in step S42, the flow shifts to step S43 to store the image sensing time in the internal memory of the SCPU 26.

If NO in step S42, the flow shifts to step S44.

In step S44, whether the contents of the communication request are to transfer the image sensing command is checked.

If YES in step S44, the flow shifts to step S45; if NO, to step S49.

In step S45, the charge drain pulse is applied to the area sensor 5 via the area sensor driving circuit 28.

Then, charges accumulated in the area sensor 5 are removed.

In step S46, the timer counter (not shown) incorporated in the SCPU 26 counts the time until the image sensing time t2 elapses.

Upon the lapse of the time t2, the flow shifts to the next processing.

During this period, object light incident on the area sensor 5 is photoelectrically converted to accumulate charges.

In step S47, the accumulated image sensing charges are transferred to the signal processing circuit 31 via the area sensor driving circuit 28.

In step S48, the image signal received in the signal processing circuit 31 is converted into digital data of an electronic image by predetermined signal processing, and the digital data is stored in the volatile memory 30.

In step S49, whether the contents of the communication request are to transfer the monitor display command is checked.

If YES in step S49, the flow shifts to step S50 to display the electronic image stored in the volatile memory 30 on the LCD monitor 29.

If NO in step S49, the flow shifts to step S51.

In step S51, whether the contents of the communication request are to transfer the nonvolatile memory storage command is checked.

If YES in step S51, the flow shifts to step S52 to transfer the data stored in the volatile memory 30 to the nonvolatile memory 36 via the data buses 32 and 25 and store the data in the nonvolatile memory 36.

If NO in step S51, the flow returns to step S41 to repetitively execute the subsequent processing.

In this way, image sensing by the area sensor 5 can also be achieved using flashlight emitted during exposure of the silver halide film 11, and silver halide photographing and electronic image sensing can be done at almost the same timing by one light emission operation.

The above embodiment of the present invention can attain the following arrangement.

(1) A silver halide photographing/electronic image sensing camera is characterized by comprising:

an electronic image sensing device having an electronic image sensing element for converting an object image into an electrical signal, and an electronic shutter means for limiting the image sensing time of the electronic image sensing element;

a monitor means for displaying the object image on the basis of an image signal output from the electronic image sensing device;

a silver halide photographing device for exposing the object image on a silver halide film; and an electronic flash device for emitting flashlight, wherein the electronic flash device starts light emission in synchronism with exposure of the silver halide photographing device, and the electronic shutter means operates during light emission.

(2) A silver halide photographing/electronic image sensing camera is characterized by comprising:

an electronic image sensing device having an electronic image sensing element for converting an object image into an electrical signal, and an electronic shutter means for limiting the image sensing time of the electronic image sensing element;

a monitor means for displaying the object image on the basis of an image signal output from the electronic image sensing device;

a silver halide photographing device for exposing the object image on a silver halide film; and an electronic flash device for emitting flashlight, wherein the electronic flash device starts light emission in synchronism with exposure of the silver halide photographing device, and the electronic shutter means starts operating during light emission.

(3) The silver halide photographing/electronic image sensing camera defined in (1) or (2) is characterized in that the electronic image sensing device has an image sensing speed switching means, and in at least flash photography, the image sensing speed switching means sets the image sensing speed to be equal to or higher than the film speed of a film loaded in the silver halide photographing device.

(4) A silver halide photographing/electronic image sensing camera is characterized by comprising:

an electronic image sensing device having an electronic image sensing element for converting an object image into an electrical signal, and an electronic shutter means for limiting the image sensing time of the electronic image sensing element;

a monitor means for displaying the object image on the basis of an image signal output from the electronic image sensing device;

a silver halide photographing device for exposing the object image on a silver halide film; and an electronic flash device for emitting flashlight, wherein the electronic flash device starts light emission in synchronism with exposure of the silver halide photographing device, and the electronic shutter means stops operating during light emission.

As has been described above, according to the present invention, image sensing by the electronic image sensing element can be done using flashlight emitted during exposure of the silver halide film in a silver halide photographing/electronic image sensing camera having both the function of an electronic image sensing device with an electronic image sensing element for converting an object image into an electrical signal, and the function of a silver halide photographing device for photographing an object image on a silver halide film. The present invention can, therefore, provide a camera capable of simultaneously taking pictures with the silver halide photographing device and electronic image sensing device without wasting flash energy.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera for exposing an object image on a silver halide film, comprising:

a shutter for adjusting an object beam which reaches the silver halide film;

an electronic flash device for irradiating an object with flashlight;

an electronic image sensing element for converting the object image into an electrical signal; and a timing circuit for outputting a first timing signal for designating a light emission timing of said electronic flash device after said shutter is opened, and outputting a second timing signal for starting operation of said electronic image sensing element in synchronism with the first timing signal.

2. A camera according to claim 1, wherein said timing circuit outputs the second timing signal a predetermined time after the first timing signal.

3. A camera according to claim 2, wherein the predetermined time is set in accordance with a film speed of the silver halide film.

4. A camera according to claim 1, wherein said timing circuit outputs the second timing signal subsequent to the first timing signal.

5. A camera according to claim therein said shutter is a focal plane shutter having a front curtain and rear curtain, and said timing circuit outputs the first timing signal before the rear curtain travels after the front curtain travels.

6. A camera according to claim 1, wherein said timing circuit outputs a third timing signal for stopping the image sensing operation a predetermined time after the second timing signal is output.

7. A camera for exposing an object image on a silver halide film, comprising:

a release operation member;

a shutter device for performing an exposure operation on the silver halide film in response to operation of said release operation member;

an electronic flash device for irradiating an object with flashlight when said shutter device is opened; and an electronic image sensing device which starts operation after a start of light emission from said electronic flash device, and which senses an image corresponding to the object image exposed on the silver halide film, wherein said electronic image sensing device terminates the image sensing operation after passage of a pre-calculated time from the starting time of the image sensing operation.

8. A camera according to claim 7, wherein said electronic image sensing device starts the image sensing operation in synchronism with the start of light emission from said electronic flash device, and wherein said pre-calculated time is based on brightness of the subject.

9. A camera according to claim 7, wherein said electronic image sensing device starts the image sensing operation a predetermined time after the start of light emission from said electronic flash device.

10. A camera according to claim 7, wherein said electronic image sensing device has a switchable image sensing speed, and adjusts the image sensing speed in accordance with a film speed of the silver halide film loaded in said camera.

11. A camera for exposing an object image on a silver halide film, comprising:

a release operation member;

a shutter device for performing an exposure operation on the silver halide film in response to operation of said release operation member;

an electronic flash device for irradiating an object with flashlight when said shutter device is opened full; and an electronic image sensing device which starts an image sensing operation prior to a start of light emission from said electronic flash device, and which stops the image sensing operation after passage of a pre-calculated time from the starting time of the image sensing operation and during light emission from said electronic flash device.

\* \* \* \* \*